(12) United States Patent
Ma et al.

(10) Patent No.: US 11,417,335 B2
(45) Date of Patent: Aug. 16, 2022

(54) METHOD AND DEVICE FOR INFORMATION PROCESSING, TERMINAL, SERVER AND STORAGE MEDIUM

(71) Applicant: Beijing Xiaomi Pinecone Electronics Co., Ltd., Beijing (CN)

(72) Inventors: Baiming Ma, Beijing (CN); Tianwei Sun, Beijing (CN); Luyu Gao, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 47 days.

(21) Appl. No.: 16/945,253

(22) Filed: Jul. 31, 2020

(65) Prior Publication Data

US 2021/0210089 A1 Jul. 8, 2021

(30) Foreign Application Priority Data

Jan. 8, 2020 (CN) .......................... 202010019034.0

(51) Int. Cl.
*G10L 15/22* (2006.01)
*G06F 3/16* (2006.01)
*G10L 15/30* (2013.01)

(52) U.S. Cl.
CPC .............. *G10L 15/22* (2013.01); *G06F 3/167* (2013.01); *G10L 15/30* (2013.01); *G10L 2015/223* (2013.01)

(58) Field of Classification Search
CPC ................................. G10L 15/22; G06F 3/167
See application file for complete search history.

(56) References Cited

U.S. PATENT DOCUMENTS

2002/0010589 A1 1/2002 Nashida et al.
2006/0004871 A1* 1/2006 Hayama .............. G06F 16/7844

FOREIGN PATENT DOCUMENTS

EP       1 176 503      *  1/2002
EP       1 176 503 A2     1/2002
WO   WO 2005/048590 A1   5/2005

OTHER PUBLICATIONS

Extended European Search Report dated Jan. 22, 2021 in European Patent Application No. 20188299.0, 7 pages.

* cited by examiner

*Primary Examiner* — Ibrahim Siddo
(74) *Attorney, Agent, or Firm* — Oblon, McClelland, Maier & Neustadt, L.L.P.

(57) ABSTRACT

Aspects of the disclosure provide a method and device for information processing, a terminal, a server and a storage medium. The method can include that voice information is collected, and, responsive the voice information instructing a target application program to be started, instruction information configured to assist in starting the target application program is determined. The method can further include that multimedia information indicated by the instruction information is output according to the instruction information in a process of starting the target application program. Therefore, the multimedia information may be output in the process of starting the application program to improve the experience of a user in starting the application program.

15 Claims, 15 Drawing Sheets

METHOD AND DEVICE FOR INFORMATION PROCESSING, TERMINAL, SERVER AND STORAGE MEDIUM

CROSS-REFERENCE TO RELATED APPLICATION

This application is based upon and claims priority to Chinese patent application No. 202010019034.0, filed on Jan. 8, 2020, the entire content of which is incorporated herein by reference.

TECHNICAL FIELD

The present disclosure generally relates to the technical field of data processing, and more particularly, to a method and device for information processing, a terminal, a server and a storage medium.

BACKGROUND

Electronic devices such as mobile phones and tablet computers are widely applied to people's daily lives. Various application programs installed in electronic devices bring great convenience to people's lives. As the number of installed application programs increases, a user usually sets multiple interfaces and/or favorites to place the application programs. When an application program is needed to be started, the application program may be clicked or a voice instruction can be sent. Along with the popularization of electronic devices, starting an application program via a voice instruction has become popular. However, all application programs, when being started through voice instructions, are always started directly. The starting manner is undiversified, and user experience is degraded.

SUMMARY

According to a first aspect of the present disclosure, a method for information processing may include that voice information is collected, responsive to that the voice information instructs a target application program to be started, instruction information configured to assist in starting the target application program is determined, and multimedia information indicated by the instruction information is output according to the instruction information in a process of starting the target application program.

According to a second aspect of the present disclosure, a method for information processing may include that voice information is received from a terminal, a target application program required to be started is determined based on the voice information, and responsive to that the target application program is among application programs supported to be started by the terminal, instruction information configured to instruct multimedia information to be output in a process of starting the target application program is sent to the terminal.

According to a third aspect of the present disclosure, a device for information processing may include a memory that is configured to store instructions executable by a processor. The processor may be configured to execute the instructions stored in the memory to implement any method of the first aspect or the second aspect.

It is to be understood that the above general descriptions and detailed descriptions below are only exemplary and explanatory, and not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
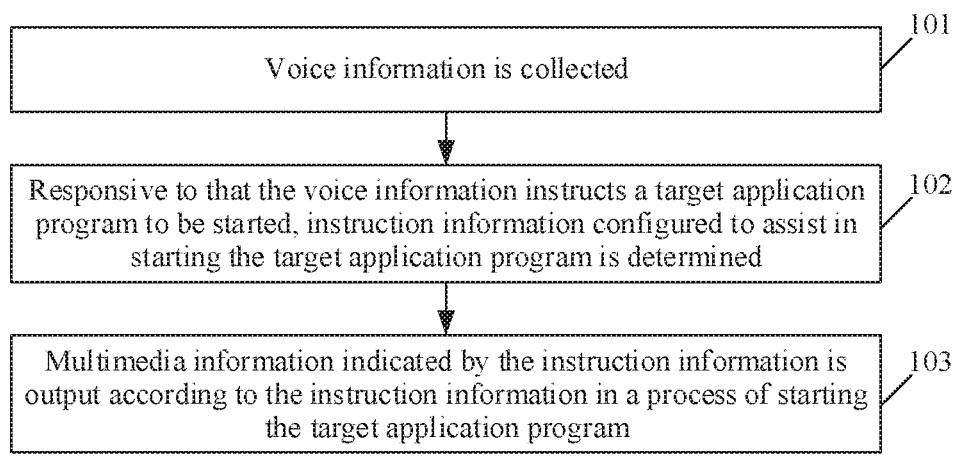
FIG. 1 is a first flowchart showing a method for information processing according to some embodiments.

For improving the experience of a user in starting an application program, the embodiments of the present disclosure provide a method for information processing. FIG. 1 is a first flowchart showing an exemplary method for information processing according to some embodiments. As shown in FIG. 1, the method includes the following operations.

In Operation 101, voice information is collected.

In Operation 102, responsive to that the voice information instructs a target application program to be started, instruction information configured to assist in starting the target application program is determined.

In Operation 103, multimedia information indicated by the instruction information is output according to the instruction information in a process of starting the target application program.

It is to be noted that the method may be applied to a terminal. The terminal can refere to an electronic device where an application program may be installed, for example, a smart phone, a computer or a smart watch. The terminal may include a terminal storing multimedia resources or a terminal storing no multimedia resources.

In a case that the terminal stores a multimedia resource, after the voice information instructing the target application program to be started is collected, the instruction information configured to assist in starting the target application program may be locally determined directly through a processor of the terminal in combination with the stored multimedia resource.

In a case that the terminal stores no multimedia resources, after the voice information instructing the target application program to be started is collected, the voice information may be sent to a server, and then the server may determine the instruction information assisting in starting the target application program and further send the instruction information to the terminal. In such a manner, the terminal may determine the instruction information configured to assist in starting the target application program.

For improving the starting of the application program, during a practical application, compared with starting of the application program by manual clicking, controlling the application program to be started through a voice instruction may be interesting to some extent and may also bring convenience to a user. Therefore, the method for information processing is specifically described on the basis that the application program is started through the voice instruction.

Herein, the voice information in Operation 101 may be collected through a Microphone (MIC), so that the terminal may be a terminal with a voice collection function. Processing of the voice information may be as follows, after the MIC of the terminal collects the voice information of a user, the MIC may send the collected voice information to the processor in the terminal. Once the processor determines that the voice information is voice information configured to instruct the target application program to be started, the instruction information configured to assist in starting the target application program may be further determined.

Processing of the voice information may also be as follows, after the MIC of the terminal collects the voice information of a user, the terminal may directly send the voice information to the server, and the server may process the voice information, determine whether the voice information is voice information configured to instruct the target application program to be started or not and, when the voice information is voice information configured to instruct the target application program to be started and it is determined that the terminal supports starting of the target application program, may return the instruction information to the terminal.

The terminal or the server, when determining whether the voice information is voice information configured to instruct the target application program to be started or not, may make a judgment through a Natural Language Processing (NLP) algorithm, namely recognizing a character string in the voice information. The terminal may then extract target information in the character string, and perform a matching processing on the target information through a matching algorithm to determine an intent of the voice information. Further, the terminal can perform matching processing on a keyword about the name of the application program according to the intent to determine whether the voice information is voice information configured to instruct the target application program to be started or not.

The target information may refer to a keyword. For example, a keyword involved more in operations over the application program may include a keyword about an action and a keyword about a name of an application program. Herein, the keyword about the action may include "start", "stop", "search" or "calculate", and the like. Matching processing may be matching processing implemented through a regular expression.

After the character string in the voice information is recognized, the character string may be matched with the keyword about the action to determine the intent of the voice information, and the keyword about the name of the application program may further be matched according to the intent to determine whether the voice information is voice information configured to instruct the target application program to be started or not. The voice information refers to voice information configured to instruct the target application program to be started.

The server or the processor of the terminal, after completing processing the voice information, may return the instruction information, and the terminal may output the multimedia information in the process of starting the target application program according to an instruction in the instruction information.

The target application program may refer to an application program to be started, as requested in the voice information. In general, the terminal may include multiple application programs. When the terminal detects a voice instruction instructing a certain application program to be started, the certain application program herein refers to the target application program.

It is to be noted that the instruction information may be generated only when it is determined that the terminal supports starting of the target application program. The situation that the terminal supports starting of the target application program may include that the target application program is installed in the terminal, or, the target application program is installed in a peripheral connected with the terminal. In such a situation, the target application program may be started under the control of the voice instruction.

It is to be noted that, if no matched name of the application program is found when the matching processing is performed on the keyword about the name of the application program, it may be determined that the terminal does not support starting of the application program. This may be because the application program is not installed in the terminal or the application program is also not installed in the peripheral connected with the terminal. In such a case, the processor of the terminal or the server may not generate any instruction information.

The multimedia information may be video information, PowerPoint information or audio information, and the like. The operation that the multimedia information is output in the process of starting the target application program may refer to that the video information, the PowerPoint information or the audio information, and the like is played in the process of starting the target application program.

Therefore, when an application program is required to be started, instruction information configured to assist in starting the application program may be determined according to collected voice information, and the terminal may further play multimedia information according to an instruction of the instruction information in a process of starting the application program. In the manner of outputting the multimedia information in the process of starting the application program, the problem that a manner of starting an application program is undiversified is solved, and the user experience is improved.

Figure 2:
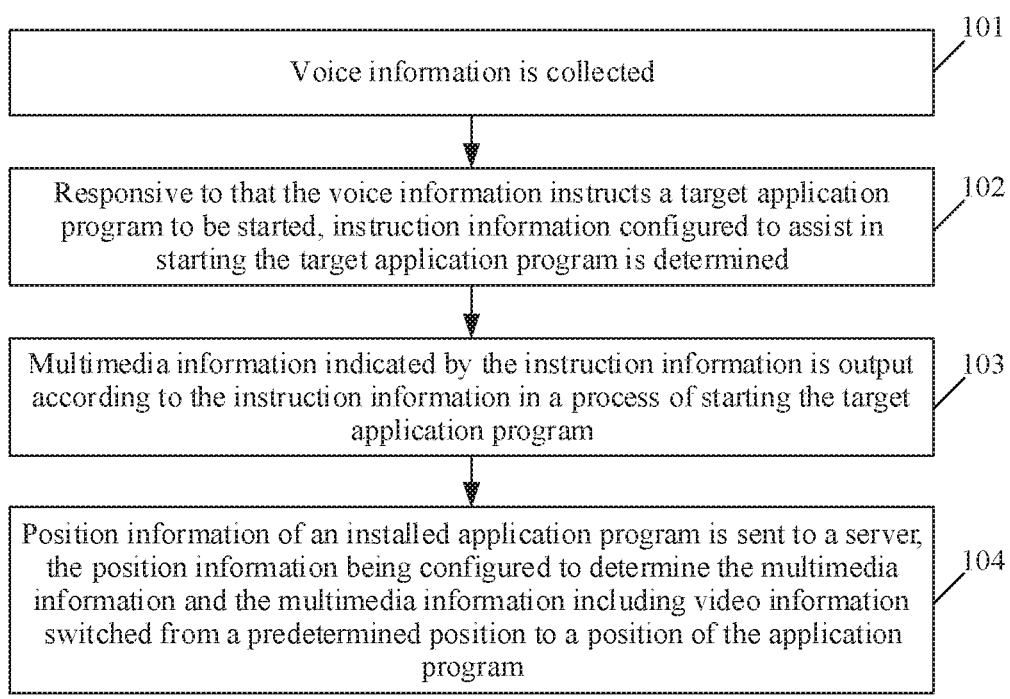
FIG. 2 is a second flowchart showing a method for information processing according to some embodiments.

FIG. 2 is a second flowchart showing a method for information processing according to some embodiments. As shown in FIG. 2, the method for information processing may further include the following operation.

In Operation 104, position information of an installed application program is sent to a server, the position information being configured to determine the multimedia information and the multimedia information including video information switched from a predetermined position to a position of the application program. In a case that the terminal stores no multimedia resources, the collected voice information may be required to be sent to the server, and then the server may determine the instruction information assisting in starting the target application program.

For determining the instruction information assisting in starting the application program, the server may be required to integrate an installation condition of the application program installed in the terminal into account to determine instruction information for each application program after collecting voice information for starting the application program.

Since the multimedia information is required to be output in the process of starting the application program and the terminal includes multiple application programs, when each piece of voice information of a user instructs different application programs to be started, corresponding multimedia information may be required to be output when each application program is started. Therefore, it is necessary to determine the multimedia information corresponding to each application program.

The position information may include storage path information and/or display position information. The storage path information may refer to an installation path of the application program in the terminal. The display position information may refer to a position of an application icon of the application program on a desktop of the terminal. The predetermined position in the terminal may include an initial installation position of the application program in the terminal or any position on the desktop. Herein, the initial installation position of the application program in the terminal usually refers to a position of a folder where an installation package of the application program is located.

The video information switched from the predetermined position of the terminal to the position of the application program specifically refers to that: when the multimedia information is video information, a content of the video information may be a process of searching for the application program, namely when the position information is the storage path information of the installed application program (the terminal sends the storage path information to the server), the video information may present a process of searching for the application program from the initial installation position of the application program in the terminal until the application program is found. In such a manner, a process of finding the application program from each folder can be presented. A video about the process of finding the application program from each folder may be made to obtain the video information. The video information is the multimedia information determined according to the storage path information.

When the position information is the display position information of the installed application program (the terminal sends the display position information to the server), the video information may present a process from any position on the desktop to a position of the application icon of the application program. For example, if the terminal has three desktops and application program A is at a second position in a second row on the second desktop, multimedia information may be determined as follows: any position on the desktop is selected as a starting point, searching is performed from the starting point to the second position, where the application program A is located, in the second row on the second desktop, and a video about this searching process is made to obtain video information that is the multimedia information determined according to the display position information.

When the terminal sends the storage path information and the display position information to the server, the video information may also be video information of a whole process of finding the application program from each folder and then conducting searching from any position on the desktop to the position of the application icon of the application program.

For determining the multimedia information corresponding to each application program, the storage path information of the application program installed in the terminal and/or the display position information of the application icon of the application program on the desktop may be sent to the server, and then the server may determine the corresponding multimedia information required to be output when the application program installed in the terminal is started according to the storage path information and/or the display position information. In such a manner, after the application program is found through the storage path information and display position information of the application program, the determined multimedia information may be output in the process of starting the application program, so that a condition can be provided for improving the user experience.

The multimedia information corresponding to each application program may be completely different or completely the same or partially the same. That is, if three application programs A, B and C are installed in the terminal, multimedia information output in processes of starting the application programs A, B and C may be video information W or may be video information O, video information P and the video information W respectively, or may be the video information W output when the application program A and the application program B are started and the video information O output when the application program C is started.

In such a manner, the server, after determining the multimedia information according to the storage path information and/or the display position information, may associate the multimedia information and the storage path information and/or display position information of the application program and may send the instruction information to indicate the multimedia information required to be output in the process of starting the application program according to such an association.

In some implementations, the instruction information may include a resource parameter, a display parameter, and component information of a starting component. Since the instruction information transmitted by the server is configured to indicate the multimedia information output in the process of starting the application program, for outputting the multimedia information in the process of starting the application program, it is needed to know a source of the multimedia information (or how to acquire the multimedia information), how to display the multimedia information and a component required to be called to output the multimedia information.

The resource parameter may be configured to acquire the multimedia information to be displayed, namely the resource parameter may be configured to indicate acquisition manner information of the multimedia information, for example, the storage path information or Uniform Resource Locator (URL) information. The multimedia information may be acquired after the storage path information or URL information of the multimedia information is obtained. For example, if the multimedia information is video information (local video) that has been downloaded in the terminal, the resource parameter may be storage path information for storage of the video information in the terminal; and if the multimedia information is video information in a specified webpage, the resource parameter may be URL information of a webpage where the video information is located.

The display parameter may be configured to indicate a display manner of the multimedia information, namely it is configured to define a display effect of the multimedia information. After the display parameter of the multimedia information is obtained, how to display the multimedia information may be known, and the display effect of the multimedia information may further be determined. Herein, different display manners may correspond to different display effects, and once the display manner is determined, the display effect may be determined. The display manner may be displaying from top to bottom, displayed from left to right, exploded displaying, gradient displaying or displaying according to a certain manner in a certain time, i.e., a display manner (a display position, a changing process and the like) of a multimedia resource corresponding to each preset time bucket (or a time point) in a display process of the multimedia information. For example, if the display parameter is action=pull From Top, time=1, then the display manner is pulling from the top and the display time is 1 second. In such an example, an achieved display effect can be th, for example, if the video is a spider-man, then the spider-man can shoot a spiderweb upwards to pull the application program from the top, and the duration can be 1 second.

The display parameter may be further configured to indicate a display type of the multimedia information, and the display type may include floating displaying. Floating displays may refer to that the multimedia information is positioned at a top layer of a display page in a line-of-sight direction by taking the line-of-sight direction of a user as a reference such that the user may perceive part or none of contents in a corresponding region of the multimedia information. For example, when the display parameter is configured to indicate the display type of floating displaying, transparency of the multimedia information may be set to be 0 (namely completely non-transparent displaying), and in such a case, the multimedia information can cover the corresponding contents in the region. The transparency may also be any value between 0 and 1, for example, 20%. In such a case, the multimedia information may be displayed according to a partially transparent effect, and meanwhile, the multimedia information cannot completely cover the corresponding contents in the region, so that the multimedia information may be viewed on the premise of not impacting viewing of contents in the display page by the user.

The component information of the starting component may be configured to indicate the component required to be called to output the multimedia information. In an example, the component information of the starting component may include the name or the serial number of the starting component. Once the name or the serial number of the starting component is acquired, the component required to be called may be known. The component may be a component in the terminal. The server may transmit the component information of the starting component to indicate the component required to be called to output the multimedia information in the process of starting the application program to the terminal.

The starting component may be an intent component. The intent component may be responsible for describing an action of an operation, data involved in the action and additional data in the application program, so that an operating system may find the corresponding component according to a description of the intent component and transmit description information in the description to the component to be called to complete calling of the component. Therefore, after the resource parameter, display parameter and component information of the starting component in the instruction information are acquired, the indicated multimedia information may be output in the process of starting the application program.

It is to be noted that, after the server returns the instruction information to the terminal, the terminal may render a page of the target application program in background and then, after displaying of the multimedia information is completed, gradually start displaying all pages of the target application program from the rendered starting page.

Figure 3:
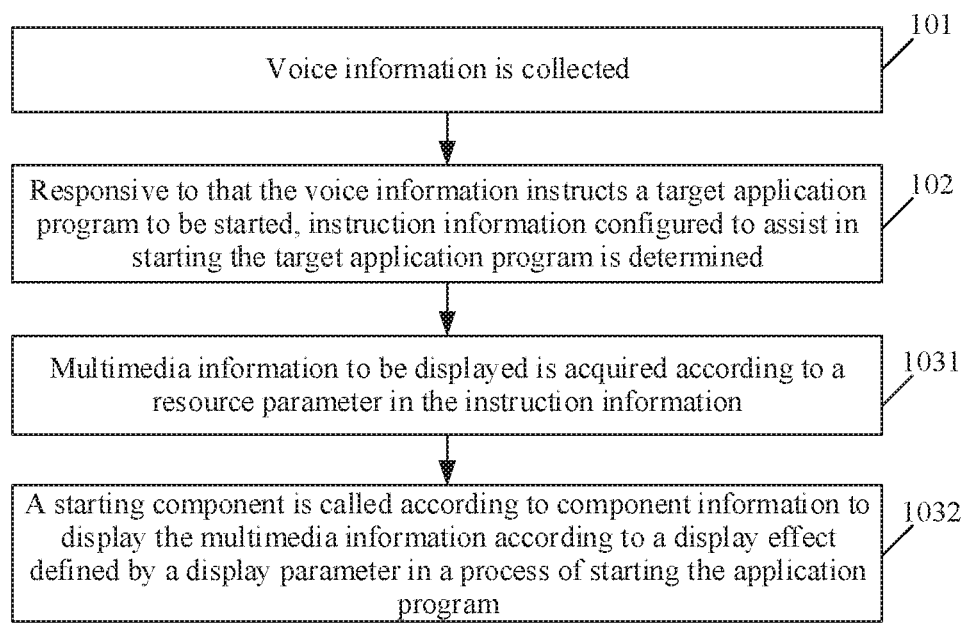
FIG. 3 is a third flowchart showing a method for information processing according to some embodiments.

Based on the above descriptions, FIG. 3 is a third flowchart showing a method for information processing according to some embodiments. As shown in FIG. 3, the operation in Operation 103 that the multimedia information indicated by the instruction information is output according to the instruction information in the process of starting the target application program may include the following operations.

In Operation 1031, the multimedia information to be displayed is acquired according to the resource parameter in the instruction information.

In Operation 1032, the starting component is called according to the component information to display the multimedia information according to a display effect defined by the display parameter in the process of starting the application program.

As described above, the multimedia information may be acquired according to the resource parameter in the instruction information, and after the multimedia information is acquired, the starting component may be called according to the component information to display the multimedia information according to the display effect defined by the display parameter in the process of starting the application program.

Figure 4A:
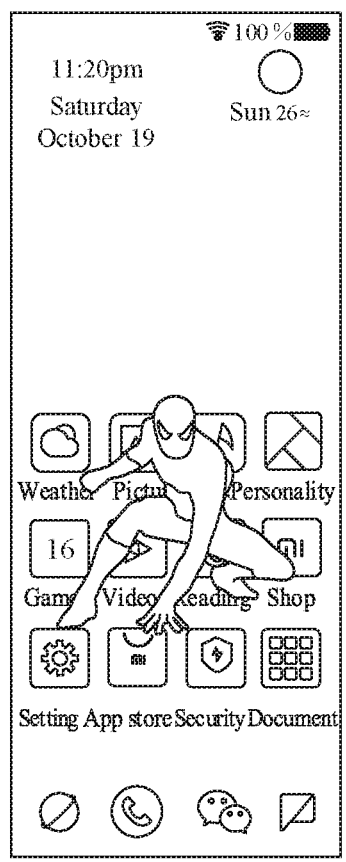
FIG. 4A is a first schematic diagram illustrating a process of starting an application program according to some embodiments.
Figure 4B:
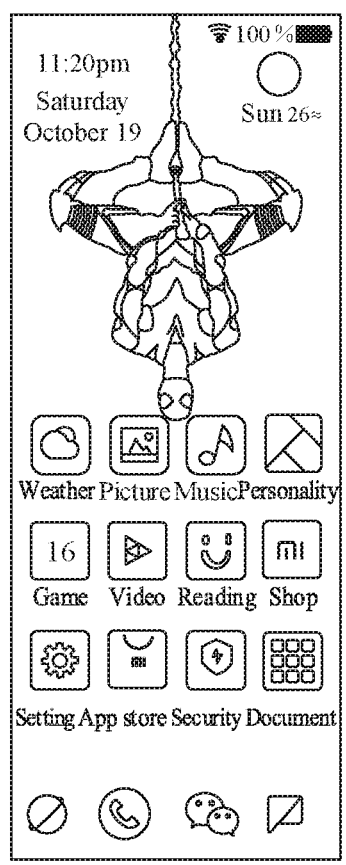
FIG. 4B is a second schematic diagram illustrating a process of starting an application program according to some embodiments.
Figure 4C:
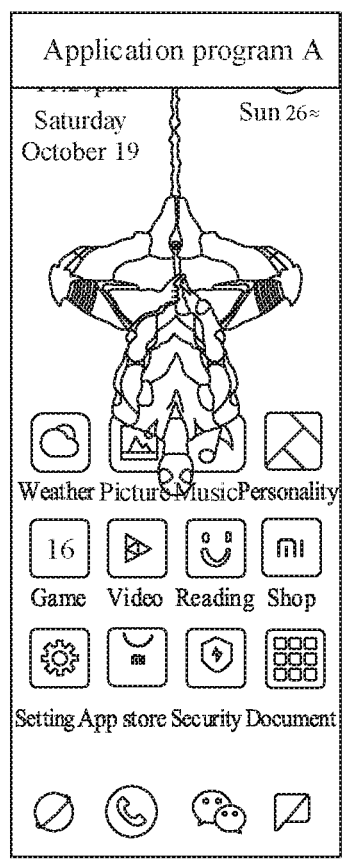
FIG. 4C is a third schematic diagram illustrating a process of starting an application program according to some embodiments.
Figure 4D:
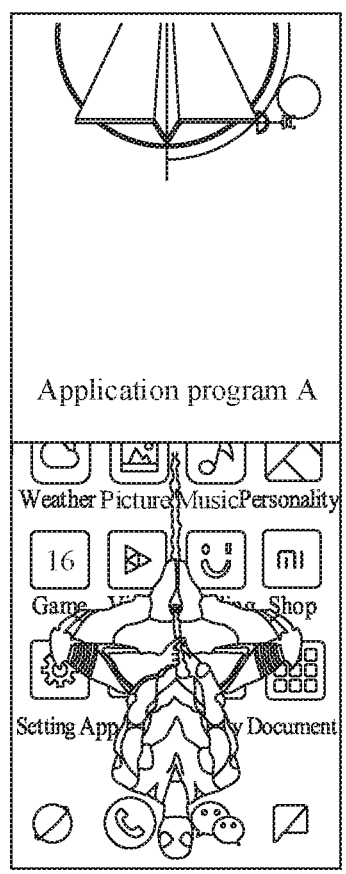
FIG. 4D is a fourth schematic diagram illustrating a process of starting an application program according to some embodiments.
Figure 4E:
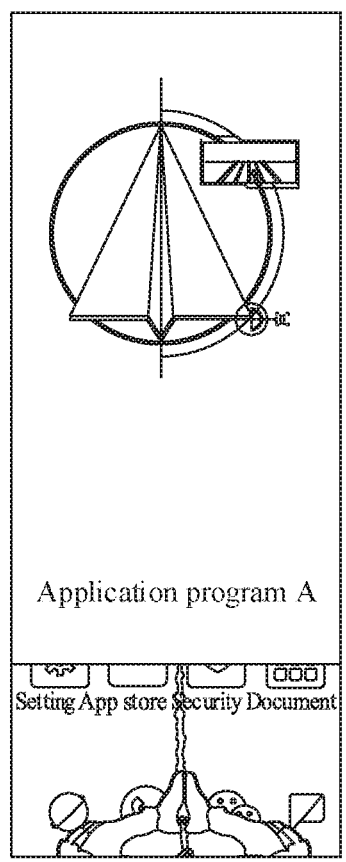
FIG. 4E is a fifth schematic diagram illustrating a process of starting an application program according to some embodiments.
Figure 4F:
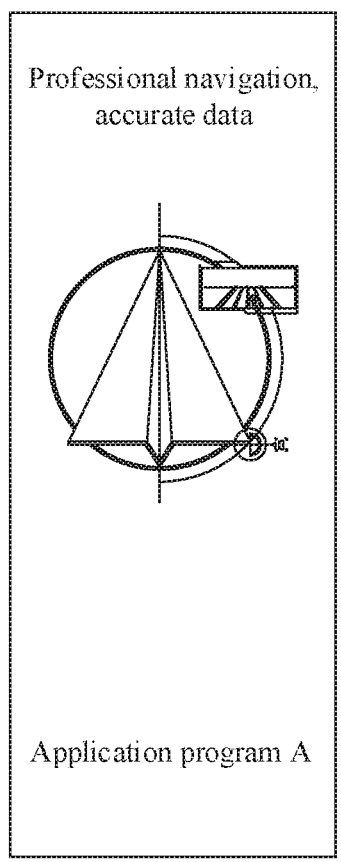
FIG. 4F is a sixth schematic diagram illustrating a process of starting an application program according to some embodiments.

The manner of displaying the multimedia information in the process of starting the application program in the embodiments of the present disclosure is exemplarily introduced. FIG. 4A to FIG. 4F show a specific process of displaying the multimedia information in the process of starting the application program. FIG. 4A is a first schematic diagram illustrating a process of starting an application program according to some embodiments. FIG. 4B is a second schematic diagram illustrating a process of starting an application program according to some embodiments. FIG. 4C is a third schematic diagram illustrating a process of starting an application program according to some embodiments. FIG. 4D is a fourth schematic diagram illustrating a process of starting an application program according to some embodiments. FIG. 4E is a fifth schematic diagram illustrating a process of starting an application program according to some embodiments. FIG. 4F is a sixth schematic diagram illustrating a process of starting an application program according to some embodiments.

As shown in FIG. 4A to FIG. 4F, before the application program A is started, multimedia information required to be output in a process of starting the application program A may be determined. Herein, the multimedia information output when the application program A is started may be video information about the spider-man. In FIG. 4A, before the application program A is formally started, a video of the spider-man may be displayed at first; and when the display parameter in the instruction transmitted by the server is action=pull From Top, time=1, the display manner may be pulling from the top and the display time may be 1 S, namely the spider man may shoot the spiderweb upwards to pull the application program A from the top and the duration may be 1 S.

FIG. 4B to FIG. 4F show a process that the spider man shoots the spiderweb upwards to pull the application program A from the top. After the multimedia video about the spider-man is displayed, a starting page of the application program A may be displayed. FIG. 4F shows the starting page of the application program A, and the application program shown herein is a navigation application program. As shown in FIG. 4F, after the spider man shoots the spiderweb upwards to pull the application program A from the top, the starting page of the application program A may be formally entered. It is to be noted that the starting page may refer to a first page in multiple pages of the application program.

Therefore, the multimedia information may be output in the process of starting the application program through the instruction information that is transmitted by the server and includes the resource parameter, the display parameter and the component information of the starting component to improve the interestingness of starting the application program and further improve the experience of the user in starting the application program.

In some implementations, the instruction information may further include a parameter of switching between the multimedia information and a starting page of the target application program, the parameter of the switching being configured to define a switching effect from the multimedia information and the starting page of the target application program.

The switching from the multimedia information to the starting page of the target application program may be top-bottom switching, left-right switching, diagonal switching and exploded switching, etc. FIG. 4A to FIG. 4F show top-bottom switching. As shown in FIG. 4B to 4F, the effect of the switching from the multimedia information to the starting page of the target application program is that: the spider man shoots the spiderweb upwards to pull the application program A from the top. In such a case, the parameter of the switching defines the switching effect of pulling the application program A from the top.

Left-right switching may refer to pulling the application program from the left or pulling it from the right. Diagonal switching may refer to pulling the application program from a diagonal point of the screen of the terminal, for example, pulling from the left upper corner to the right lower corner. Exploded switching may refer to suddenly displaying the starting page of the application program from the center of the screen of the terminal in an exploded manner, namely displaying the starting page of the application program according to a bomb explosion effect after a last frame of the multimedia information is played.

It is to be noted that the switching effect defined by the parameter of the switching may also be another effect, for example, gradient switching or a bouncing manner. The effect of the switching from the multimedia information to the starting page of the target application program is not limited in the embodiments of the present disclosure.

Based on the parameter of the switching, the method in the embodiments of the present disclosure may further include that after displaying of the multimedia information is completed, switching to the starting page may be executed according to the effect of the switching defined by the parameter of the switching. Therefore, the effect of the switching from the multimedia information to the starting page of the target application program may be set through the parameter of the switching to enrich an effect presented in the process of starting the target application program to further improve the interestingness of starting the application program.

In some implementations, the multimedia information may include video information, and the parameter of the switching may include a vanishing direction of a video frame in the video information, the vanishing direction being determined according to an orientation and/or a movement direction of a predetermined graphic element in a last video frame in the video information.

When the multimedia information is the video information, the video information may specifically be video information downloaded from the Internet or video information obtained by making a video of a process of searching the terminal for the application program.

The parameter of the switching between the multimedia information and the starting page of the target application program may refer to the vanishing direction of the video frame in the video information. The predetermined graphic element may refer to a graphic element displayed in the multimedia information. The orientation of the predetermined graphic element may refer to an orientation of the predetermined graphic element, and the movement direction of the predetermined graphic element may be a movement direction of the predetermined graphic element in the video. For example, if a movement direction of the spider-man in the video information about the spider-man is downward, the vanishing direction of the video frame may be downward; and if an orientation of the spider-man is downward, the vanishing direction of the video frame may be downward.

The orientation may be upward, downward, leftward or rightward, etc. The movement information may also be upward, downward, leftward, rightward or moving outwards from the center of the screen, and the like. Therefore, when the multimedia information is displayed from left to right, the starting page of the target application program may be displayed from left to right to gradually display the whole starting page, namely the starting page may be pulled from the left side of the terminal until the whole starting page is displayed on the screen of the terminal. When the multimedia information is displayed from top to bottom, the starting page of the target application program may be displayed from top to bottom to gradually display the whole starting page, namely the starting page may be pulled from the upper side of the terminal until the whole starting page is displayed on the screen of the terminal. When the multimedia information is displayed in a manner of moving outwards from the center of the screen, the starting page of the target application program may start appearing from the center of the screen and then may be expanded outwards to gradually display the whole starting page, namely the starting page may be pulled from the central position of the screen of the terminal until the whole starting page is displayed on the screen of the terminal. In the process that the starting page starts to be expanded outwards from the center of the screen, the last video frame of the multimedia information may start to be vanished outwards from the center of the screen.

In an example, FIG. 4A to FIG. 4F show a specific process of displaying the multimedia information. The parameter of the switching may be a vanishing direction of a video frame where the spider-man is located, and the vanishing direction of the video frame where the spider-man is located may be determined through the movement direction of the spider-man. As shown in FIG. 4C to FIG. 4E, the movement direction of the spider-man may be downward, and then the vanishing direction of the video frame where the spider-man is located may be downward. In such a case, the effect of the switching from the multimedia information to the starting page of the target application program may be that the starting page of the target application program is pulled from the top, thereby implementing downward displaying. The predetermined graphic element in the multimedia information in FIG. 4A to FIG. 4F is that the spider man shoots the spiderweb.

Based on the vanishing direction of the video frame in the video information, the operation that switching to the starting page is executed according to the switching effect defined by the parameter of the switching after displaying of the multimedia information is completed may include that displaying of the video frame is gradually ended at the last video frame of the video information according to the vanishing direction of the video frame. The starting page can be expanded for displaying by taking the vanishing direction of the video frame as an expansion direction of the starting page of the target application program.

The vanishing direction of the video frame in the video information may refer to a direction where the video frame in the multimedia information displayed on the screen of the terminal is gradually reduced. The expansion direction of the starting page of the target application program may be the same as the vanishing direction of the video frame in the video information. The vanishing direction of the video frame may refer to a direction where an area of the video frame displayed on the screen of the terminal becomes increasingly smaller. The expansion direction of the starting page of the target application program may refer to a direction where an area of the starting page, displayed on the screen of the terminal, of the target application program becomes increasingly larger.

As shown in FIG. 4C to FIG. 4D, since the starting page of the application program A has been pulled downwards for a certain distance, a video frame of the multimedia information in FIG. 4D may be smaller than a video frame of the multimedia information in FIG. 4C, and correspondingly, the starting page of the application program A in FIG. 4D may be larger than the starting page of the application program A in FIG. 4C. In such a case, from FIG. 4C to FIG. 4D, the vanishing direction of the last video frame of the multimedia information is downward, and the expansion direction of the starting page is also downward.

Therefore, the effect of the switching from the multimedia information to the starting page of the target application program may be set through a content of the multimedia information to present a process of switching between the multimedia information and the starting page of the target application program with a better matching effect and provide a better display effect for starting of the application program.

Figure 5:
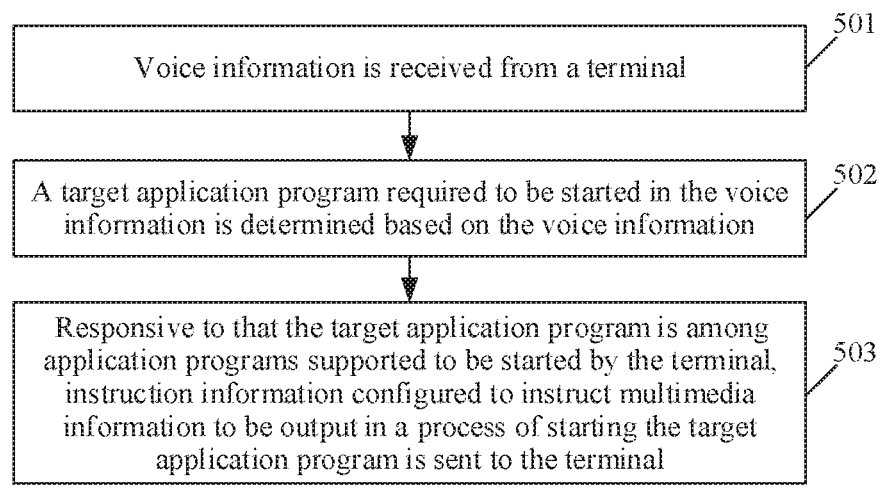
FIG. 5 is a fourth flowchart showing a method for information processing according to some embodiments.

For improving the experience of a user in starting an application program, the embodiments of the present disclosure also provide a method for information processing. FIG. 5 is a fourth flowchart showing a method for information processing according to some embodiments. As shown in FIG. 5, the method may include the following operations.

In Operation 501, voice information is received from a terminal.

In Operation 502, a target application program required to be started in the voice information is determined based on the voice information.

In Operation 503, responsive to that the target application program is among application programs supported to be started by the terminal, instruction information configured to instruct multimedia information to be output in a process of starting the target application program is sent to the terminal.

It is to be noted that the method may be applied to a server. The server may be a cloud server or a server cluster. The voice information may refer to voice information configured to instruct the target application program to be started. The target application program may refer to an application program requested to be started in the voice information.

When the terminal is required to start the application program and the terminal stores no multimedia resources, the voice information configured to control the application program to be started may be sent to the server, and the server may receive the voice information and determine the target application program required to be started in the voice information. The server, after determining that the target application program is among the application programs supported to be started by the terminal, may return the instruction information configured to indicate the multimedia information required to be output in the process of starting the target application program to the terminal.

The multimedia information may be video information, PowerPoint information or audio information, and then like. The operation that the multimedia information is output in the process of starting the target application program may refer to that the video information, the PowerPoint information or the audio information, and the like is played in the process of starting the target application program.

The situation that the target application program is among the application programs supported to be started by the terminal may refer to that: the target application program is installed in the terminal, or, the application program is installed in a peripheral connected with the terminal. In such a case, the target application program may be started under the control of a voice instruction.

Therefore, according to the embodiments of the present disclosure, when an application program is required to be started, collected instruction information may be sent to the server, then the server may return instruction information, and the terminal may further play multimedia information according to an instruction in the instruction information in a process of starting the application program. In the manner of outputting the multimedia information in the process of starting the application program, the problem that a present application program starting manner is undiversified is solved, and the user experience is improved.

Figure 6:
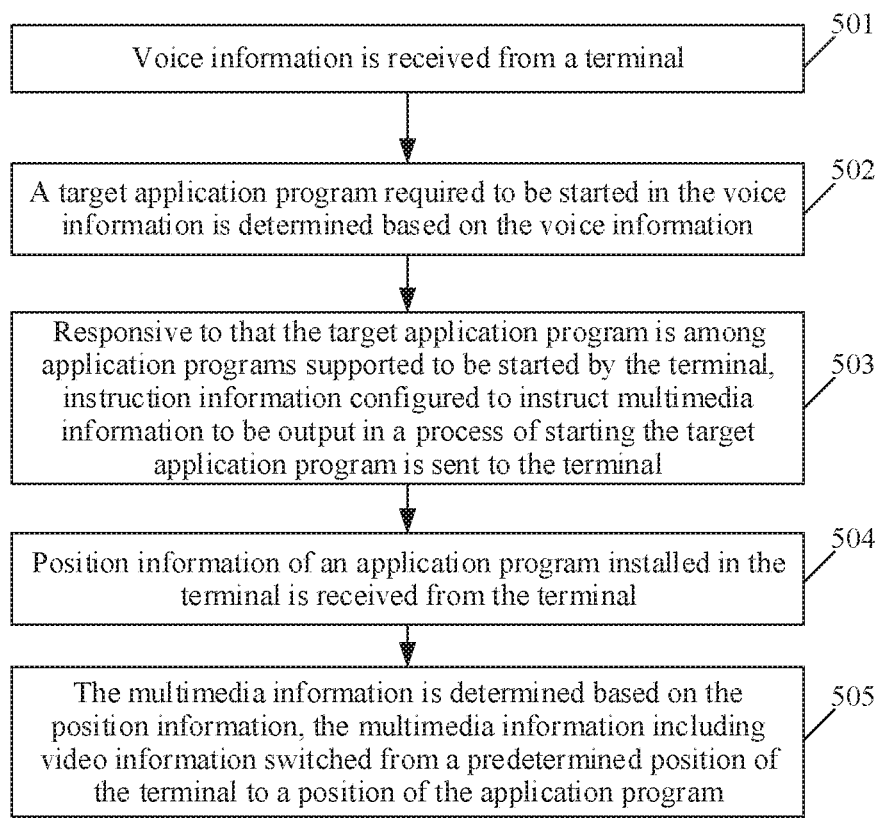
FIG. 6 is a fifth flowchart showing a method for information processing according to some embodiments.

FIG. 6 is a fifth flowchart showing a method for information processing according to some embodiments. As shown in FIG. 6, the method for information processing may further include the following operations.

In Operation 504, position information of an application program installed in the terminal is received from the terminal.

In Operation 505, the multimedia information is determined based on the position information, the multimedia information including video information switched from a predetermined position of the terminal to a position of the application program.

Since the multimedia information is required to be output in the process of starting the application program and the terminal includes multiple application programs, when each piece of voice information of a user instructs different application programs to be started, corresponding multimedia information may be required to be output when each application program is started. Therefore, it is needed to determine the multimedia information corresponding to each application program.

The position information may include storage path information and/or display position information. The storage path information may refer to an installation path of the application program in the terminal. The display position information may refer to a position of an application icon of the application program on a desktop of the terminal. The predetermined position in the terminal may include an initial installation position of the application program in the terminal or any position on the desktop. Herein, the initial installation position of the application program in the terminal usually refers to a position of a folder where an installation package of the application program is located.

For determining the multimedia information corresponding to each application program, the storage path information of the application program installed in the terminal and/or the display position information of the application icon of the application program on the desktop may be sent to the server, and then the server may determine the corresponding multimedia information required to be output when the application program installed in the terminal is started according to the storage path information and/or the display position information. In such a manner, after the application program is found through the storage path information and/or display position information of the application program, the determined multimedia information may be output in the process of starting the application program, so that a condition can be provided for improving the user experience.

The instruction information may include a resource parameter, a display parameter and component information of a starting component. The resource parameter is configured to determine the multimedia information to be displayed. The component information of the starting component is configured to display the multimedia information according to a display effect defined by the display parameter in the process of starting the application program.

The instruction information may further include a parameter of switching configured to switch the terminal to display a starting page according to a switching effect defined by the parameter of the switching after displaying of the multimedia information is completed. The multimedia information may include video information.

The parameter of the switching may further include a vanishing direction of a video frame in the video information, the vanishing direction being determined according to an orientation and/or movement direction of a predetermined graphic element in a last video frame in the video information.

Since the instruction information is configured to indicate the multimedia information output in the process of starting the application program, for outputting the multimedia information in the process of starting the application program, it is needed to know a source of the multimedia information (or how to acquire the multimedia information), how to display the multimedia information and a component required to be called to output the multimedia information.

Therefore, after the resource parameter, display parameter and component information of the starting component in the instruction information are acquired, the indicated multimedia information may be output in the process of starting the application program.

Switching from the multimedia information to the starting page of the target application program may be top-bottom switching, left-right switching, diagonal switching and exploded switching, etc. FIG. 4A to FIG. 4F show top-bottom switching. As shown in FIG. 4B to 4F, the effect of the switching from the multimedia information to the starting page of the target application program may be that: the spider man shoots the spiderweb upwards to pull the application program A from the top. In such a case, the parameter of the switching defines the switching effect of pulling the application program A from the top.

Therefore, setting the effect of the switching from the multimedia information to the starting page of the target application program through the parameter of the switching may enrich an effect presented in the process of starting the target application program to further improve the interestingness of starting the application program.

The vanishing direction of the video frame in the video information may refer to a direction where the video frame in the multimedia information displayed on the screen of the terminal is gradually reduced. The expansion direction of the starting page of the target application program may be the same as the vanishing direction of the video frame in the video information. The vanishing direction of the video frame may refer to a direction where an area of the video frame displayed on the screen of the terminal becomes increasingly smaller. The expansion direction of the starting page of the target application program may refer to a direction where an area of the starting page, displayed on the screen of the terminal, of the target application program becomes increasingly larger.

Therefore, the effect of the switching from the multimedia information to the starting page of the target application program may be set through a content of the multimedia information to present a switching process of the multimedia information and the starting page of the target application program with a better matching effect and provide a better display effect for starting of the application program.

Figure 7:
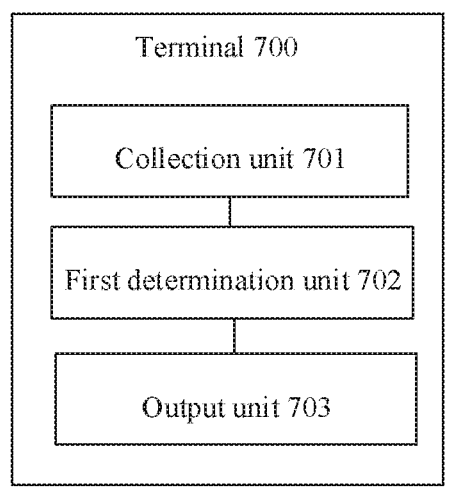
FIG. 7 is a structure diagram of a terminal according to some embodiments.

For improving the experience of a user in starting an application program, the embodiments of the present disclosure also provide a terminal. FIG. 7 is a structure diagram of a terminal according to some embodiments. As shown in FIG. 7, the terminal 700 can include a collection unit 701 that is configured to collect voice information. The terminal 700 can also include a first determination unit 702 that is configured to, responsive to that the voice information instructs a target application program to be started, determine instruction information configured to assist in starting the target application program, and an output unit 703 that is configured to output multimedia information indicated by the instruction information according to the instruction information in a process of starting the target application program.

It is to be noted that the terminal 700 may be a terminal storing multimedia resources or may also be a terminal storing no multimedia resources. The terminal 700 specifically may be an electronic device installed with an application program, for example, a smart phone, a computer or a smart watch. When the terminal stores a multimedia resource, after the voice information instructing the target application program to be started is collected, the instruction information configured to assist in starting the target application program may be determined directly through a processor of the terminal in combination with the stored multimedia resource.

When the terminal stores no multimedia resources, after the voice information instructing the target application program to be started is collected, the voice information may be sent to a server, and then the server may determine the instruction information assisting in starting the target application program and further send the instruction information to the terminal. In such a manner, the terminal may determine the instruction information configured to assist in starting the target application program.

Therefore, according to the embodiments of the present disclosure, when an application program is required to be started, instruction information configured to assist in starting the target application program may be determined through the determination unit 702, and the terminal may further play multimedia information according to an instruction of the instruction information in a process of starting the application program. In the manner of outputting the multimedia information in the process of starting the application program, the problem that a present application program starting manner is undiversified is solved, and the user experience is improved.

In an embodiment, the terminal may further include a second sending unit that is configured to send position information of an application program installed in the terminal to a server, the position information being configured to determine the multimedia information and the multimedia information including video information switched from a predetermined position of the terminal to a position of the application program.

In an embodiment, the instruction information may include a resource parameter, a display parameter and component information of a starting component.

The output unit may include an acquisition unit that is configured to acquire the multimedia information to be displayed according to the resource parameter in the instruction information, and a display unit that is configured to call the starting component according to the component information to display the multimedia information according to a display effect defined by the display parameter in the process of starting the application program.

Therefore, after the resource parameter, display parameter and component information of the starting component in the instruction information are acquired, the indicated multimedia information may be output in the process of starting the application program to improve the interest of starting the application program.

In an embodiment, the instruction information may further include a parameter of switching between the multimedia information and a starting page of the target application program.

The terminal may further include a switching unit that is configured to, after displaying of the multimedia information is completed, execute switching to the starting page according to a switching effect defined by the parameter of the switching. Therefore, the switching effect from the multimedia information to the starting page of the target application program may be set through the parameter of the switching to enrich an effect presented in the process of starting the target application program to further improve the user experience.

In some implementations, the multimedia information may include video information. The parameter of the switching may include a vanishing direction of a video frame in the video information, the vanishing direction being determined according to an orientation and/or movement direction of a predetermined graphic element in a last video frame in the video information.

The switching unit may include a vanishing processing unit that is configured to vanished the displayed video frame at the last video frame of the video information according to the vanishing direction of the video frame, and an expansion processing unit that is configured to expand the starting page by taking the vanishing direction of the video frame as an expansion direction of the starting page of the target application program.

Therefore, the effect of the switching from the multimedia information to the starting page of the target application program may be set through a content of the multimedia information to present a switching process of the multimedia information and the starting page of the target application program with a better matching effect and provide a better display effect for starting of the application program.

Figure 8:
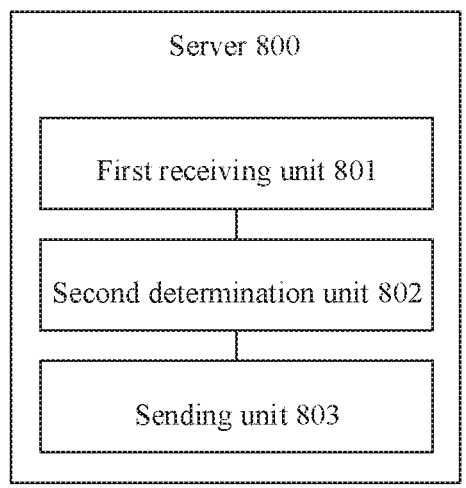
FIG. 8 is a structure diagram of a server according to some embodiments.

For improving the experience of a user in starting an application program, the embodiments of the present disclosure also provide a server. FIG. 8 is a structure diagram of a server according to some embodiments. As shown in FIG. 8, the server 800 includes a first receiving unit 801 that is configured to receive voice information from a terminal, a second determination unit 802 that is configured to determine a target application program required to be started in the voice information based on the voice information, and a sending unit 803 that is configured to, responsive to that the target application program is among application programs supported to be started by the terminal, send instruction information configured to instruct multimedia information to be output in a process of starting the target application program to the terminal.

Therefore, when an application program is required to be started, collected instruction information may be sent to the server, then the server may return instruction information, and the terminal may further play multimedia information according to an instruction in the instruction information in a process of starting the application program. In the manner of outputting the multimedia information in the process of starting the application program, the problem that a present application program starting manner is undiversified is solved, and the experience of the user in starting the application program is improved.

In some implementations, the server may further include a second receiving unit that is configured to receive, from the terminal, position information of an application program installed in the terminal, and a third determination unit that is configured to determine the multimedia information based on the position information, the multimedia information including video information switched from a predetermined position of the terminal to a position of the application program.

In some implementations, the instruction information may include a resource parameter, a display parameter and component information of a starting component. The resource parameter is configured to determine the multimedia information to be displayed.

The component information of the starting component is configured to display the multimedia information according to a display effect defined by the display parameter in the process of starting the application program. Therefore, after the resource parameter, display parameter and component information of the starting component in the instruction information are acquired, the indicated multimedia information may be output in the process of starting the application program to improve the interestingness of starting the application program.

In some implementations, the instruction information may further include a parameter of switching that is configured to switch the terminal to display a starting page according to a switching effect defined by the parameter of the switching after displaying of the multimedia information is completed. Therefore, the effect of the switching from the multimedia information to the starting page of the target application program may be set through the parameter of the switching to enrich an effect presented in the process of starting the target application program to further improve the interestingness of starting the application program.

In some implementations, the multimedia information may include video information.

The parameter of the switching may further include a vanishing direction of a video frame in the video information, the vanishing direction being determined according to an orientation and/or movement direction of a predetermined graphic element in a last video frame in the video information. Therefore, the effect of the switching from the multimedia information to the starting page of the target application program may be set through a content of the multimedia information to present a switching process of the multimedia information and the starting page of the target application program with a better matching effect and provide a better display effect for starting of the application program.

With respect to the device in the above embodiments, the specific manners for performing operations for individual units therein have been described in detail in the embodiment regarding the method, which will not be elaborated herein.

Figure 9:
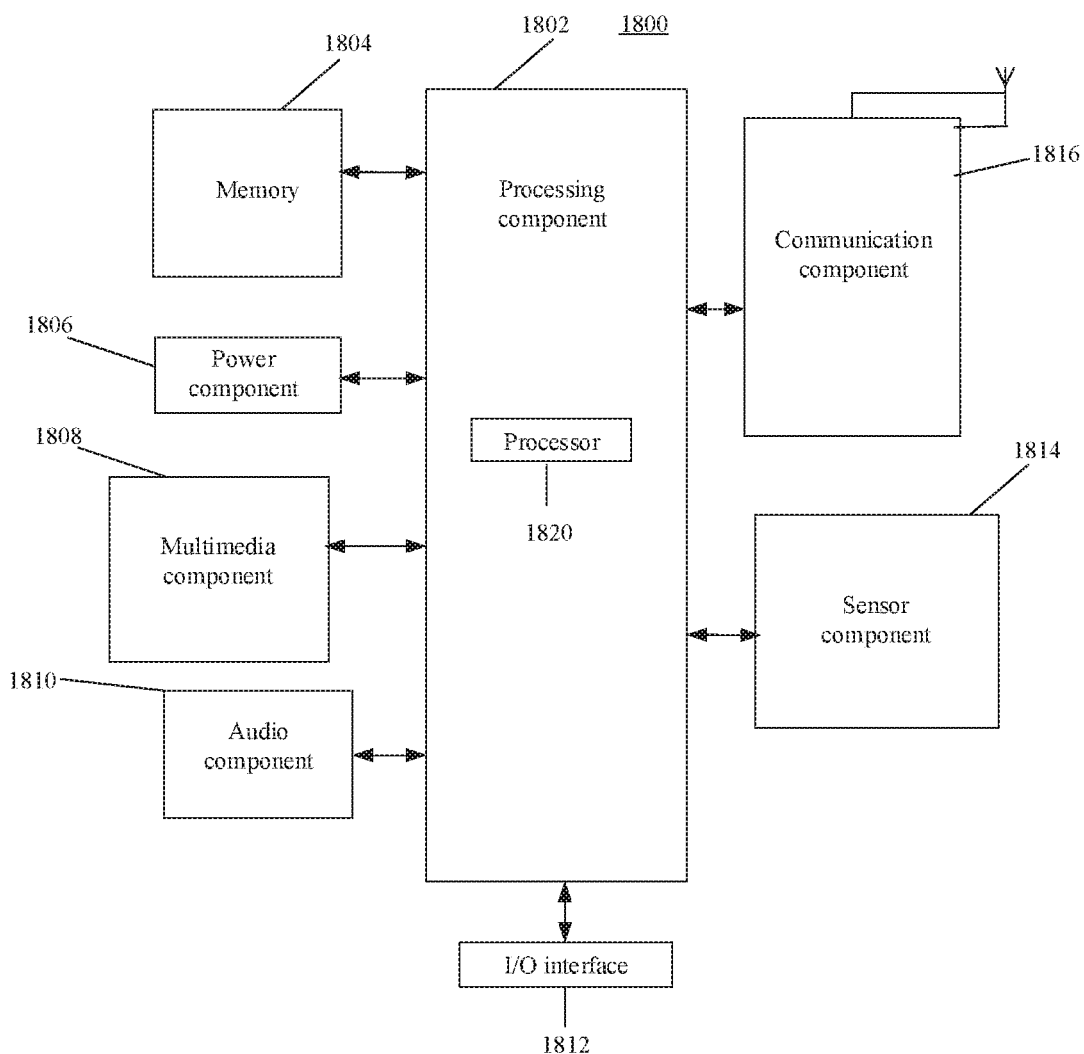
FIG. 9 is a first block diagram of a device for information processing according to some embodiments.

FIG. 9 is a block diagram of a device for information processing 1800 according to some embodiments. For example, the device 1800 may be a mobile phone, a computer, a digital broadcast terminal, a messaging device, a gaming console, a tablet, a medical device, exercise equipment, a personal digital assistant and the like.

The device 1800 may include one or more of the following components: a processing component 1802, a memory 1804, a power component 1806, a multimedia component 1808, an audio component 1810, an Input/Output (I/O) interface 1812, a sensor component 1814, and a communication component 1816.

The processing component 1802 is typically configured to control overall operations of the device 1800, such as the operations associated with display, telephone calls, data communications, camera operations, and recording operations. The processing component 1802 may include one or more processors 1820 to execute instructions to perform all or part of the operations in the abovementioned methods. Moreover, the processing component 1802 may further include one or more modules which facilitate interaction between the processing component 1802 and other components. For instance, the processing component 1802 may include a multimedia module to facilitate interaction between the multimedia component 1808 and the processing component 1802.

The memory 1804 is configured to store various types of data to support the operation of the device 1800. Examples of such data include instructions for any applications or methods operated on the device 1800, contact data, phonebook data, messages, pictures, video, and the like. The memory 1804 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1806 is configured to provide power for various components of the device 1800. The power component 1806 may include a power management system, one or more power supplies, and other components associated with generation, management and distribution of power for the device 1800.

The multimedia component 1808 may include a screen providing an output interface between the device 1800 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some embodiments, the multimedia component 1808 includes a front camera and/or a rear camera. The front camera and/or the rear camera may receive external multimedia data when the device 1800 is in an operation mode, such as a photographing mode or a video mode. Each of the front camera and/or the rear camera may be a fixed optical lens system or have focusing and optical zooming capabilities.

The audio component 1810 is configured to output and/or input an audio signal. For example, the audio component 1810 includes a MIC, and the MIC is configured to receive an external audio signal when the device 1800 is in the operation mode, such as a call mode, a recording mode and a voice recognition mode. The received audio signal may further be stored in the memory 1804 or sent through the communication component 1816. In some embodiments, the audio component 1810 further includes a speaker configured to output the audio signal.

The I/O interface 1812 is configured to provide an interface between the processing component 1802 and a peripheral interface module, and the peripheral interface module may be a keyboard, a click wheel, a button and the like. The button may include, but not limited to a home button, a volume button, a starting button and a locking button.

The sensor component 1814 may include one or more sensors configured to provide status assessment in various aspects for the device 1800. For instance, the sensor component 1814 may detect an on/off status of the device 1800 and relative positioning of components, such as a display and small keyboard of the device 1800, and the sensor component 1814 may further detect a change in a position of the device 1800 or a component of the device 1800, presence or absence of contact between the user and the device 1800, orientation or acceleration/deceleration of the device 1800 and a change in temperature of the device 1800. The sensor component 1814 may include a proximity sensor configured to detect presence of an object nearby without any physical contact. The sensor component 1814 may also include a light sensor, such as a Complementary Metal Oxide Semiconductor (CMOS) or Charge Coupled Device (CCD) image sensor, configured for use in an imaging application. In some embodiments, the sensor component 1814 may also include an acceleration sensor, a gyroscope sensor, a magnetic sensor, a pressure sensor or a temperature sensor.

The communication component 1816 is configured to facilitate wired or wireless communication between the device 1800 and another device. The device 1800 may access a communication-standard-based wireless network, such as a Wireless Fidelity (WiFi) network, a 2nd-Generation (2G) or 3rd-Generation (3G) network or a combination thereof. In some implementations, the communication component 1816 receives a broadcast signal or broadcast associated information from an external broadcast management system through a broadcast channel. In some implementations, the communication component 1816 further includes a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology or another technology.

In some implementations, the device 1800 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the above-mentioned method.

In some embodiments, there is also provided a non-transitory computer-readable storage medium including an instruction, such as the memory 1804 including an instruction, and the instruction may be executed by the processor 1820 of the device 1800 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

According to a non-transitory computer-readable storage medium, instructions in the storage medium may be executed by a processor to execute the methods for information processing.

Figure 10:
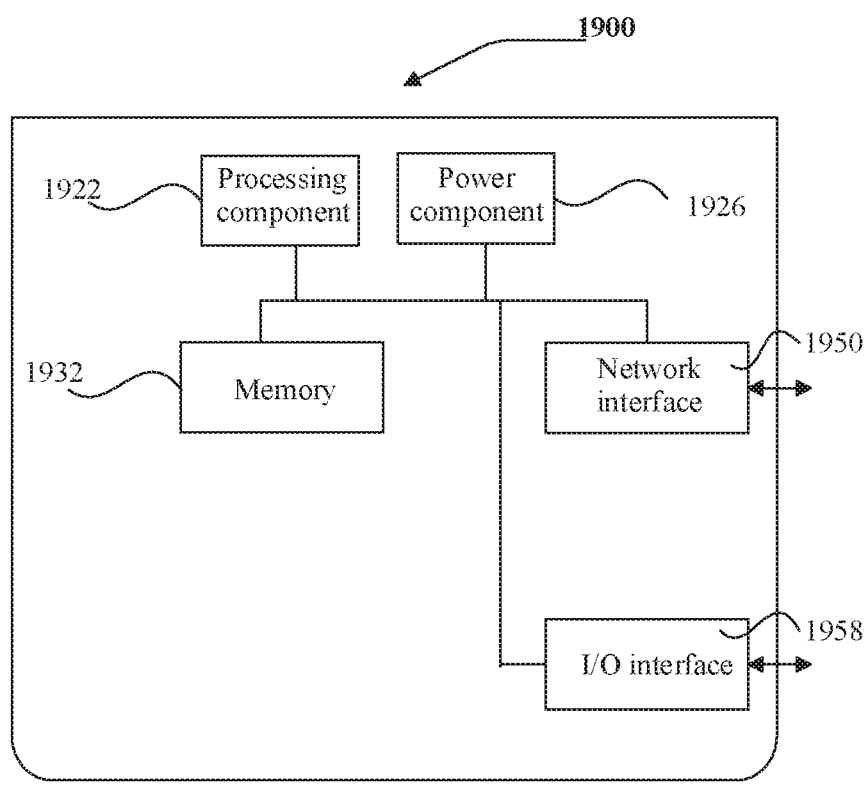
FIG. 10 is a second block diagram of a device for information processing according to some embodiments.

FIG. 10 is a second block diagram of a device for information processing 1900 according to some embodiments. For example, the device 1900 may be provided as a server. Referring to FIG. 10, the device 1900 includes a processing component 1922 which further includes one or more processors, and a memory resource represented by a memory 1932 configured to store instructions executable by the processing component 1922, for example, an application program. The application program stored in the memory 1932 may include one or more than one module of which each corresponds to a set of instructions. In addition, the processing component 1922 is configured to execute the instruction to execute the above-mentioned method.

The device 1900 may further include a power component 1926 configured to execute power management of the device 1900, a wired or wireless network interface 1950 configured to connect the device 1900 to a network and an I/O interface 1958. The device 1900 may be operated based on an operating system stored in the memory 1932, for example, Windows Server™, Mac OS X™, Unix™, Linux™, FreeBSD™, or the like.

Other implementations of the present disclosure will be apparent to those skilled in the art from consideration of the specification and practice of the present disclosure. This present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for information processing, comprising:
collecting voice information;
determining instruction information configured to assist in starting a target application program when the voice information instructs the target application program to be started; and
outputting multimedia information indicated by the instruction information according to the instruction information in a process of starting the target application program,
wherein the multimedia information comprises video information displacing a process of switching from a predetermined position of the target application program in the terminal to a current position of the target application program in the terminal, wherein the predetermined position of the target application program in the terminal comprises an initial installation position of the target application program in the terminal or any position on a desktop of the terminal.

2. The method of claim 1, wherein:
the instruction information includes a resource parameter, a display parameter, and component information of a starting component, and
outputting the multimedia information indicated by the instruction information according to the instruction information in the process of starting the target application program further comprises:
acquiring the multimedia information to be displayed according to the resource parameter in the instruction information, and
calling the starting component according to the component information to display the multimedia information according to a display effect defined by the display parameter in the process of starting the application program.

3. The method of claim 1, wherein:
the instruction information includes a parameter of switching between the multimedia information and a starting page of the target application program, and
the method further comprises:
executing switching to the starting page according to a switching effect defined by the parameter of the switching after displaying of the multimedia information is completed.

4. The method of claim 3, wherein:
the parameter of the switching includes a vanishing direction of a video frame in the video information, the vanishing direction being determined according to at least one of an orientation and a movement direction of a predetermined graphic element in a last video frame in the video information, and
executing switching to the starting page according to the switching effect defined by the parameter of the switching after displaying of the multimedia information is completed further comprises:
vanishing the video frame at the last video frame of the video information according to the vanishing direction of the video frame; and
expanding the starting page by taking the vanishing direction of the video frame as an expansion direction of the starting page of the target application program.

5. A method for information processing, comprising:
receiving voice information from a terminal;
determining a target application program required to be started based on the voice information; and
sending instruction information configured to instruct multimedia information to be output in a process of starting the target application program to the terminal when the target application program is among application programs supported to be started by the terminal,
wherein the multimedia information comprises video information displaying a process of switching from a predetermined position of the target application program in the terminal to a current position of the target application program in the terminal, wherein the predetermined position of the target application program in the terminal comprises an initial installation position of the target application program in the terminal or any position on a desktop of the terminal.

6. The method of claim 5, further comprising:
receiving, from the terminal, position information of an application program installed in the terminal; and
determining the multimedia information based on the position information.

7. A terminal, comprising:
a processor, and
a memory that is configured to store instructions executable by the processor;
wherein the processor is configured to:
collect voice information;
determine instruction information configured to assist in starting the target application program when the voice information instructs a target application program to be started; and
output multimedia information indicated by the instruction information according to the instruction information in a process of starting the target application program,
wherein the multimedia information comprises video information displacing a process of switching from a predetermined position of the target application program in the terminal to a current position of the target application program in the terminal, wherein the predetermined position of the target application program in the terminal comprises an initial installation position of the target application program in the terminal or any position on a desktop of the terminal.

8. The terminal of claim 7, wherein:
the instruction information includes a resource parameter, a display parameter, and component information of a starting component,
the processor is further configured to:
acquire the multimedia information to be displayed according to the resource parameter in the instruction information; and
call the starting component according to the component information to display the multimedia information according to a display effect defined by the display parameter in the process of starting the application program.

9. The terminal of claim 7, wherein:
the instruction information includes a parameter of switching between the multimedia information and a starting page of the target application program, and
the processor is further configured to:
execute switching to the starting page according to a switching effect defined by the parameter of the switching after displaying of the multimedia information is completed.

10. The terminal of claim 9, wherein
the parameter of the switching includes a vanishing direction of a video frame in the video information, the vanishing direction being determined according to an orientation and/or movement direction of a predetermined graphic element in a last video frame in the video information, and
the processor is further configured to:
vanish the video frame at the last video frame of the video information according to the vanishing direction of the video frame; and
expand the starting page by taking the vanishing direction of the video frame as an expansion direction of the starting page of the target application program.

11. A server, comprising:
a processor; and
a memory that is configured to store instructions executable by the processor,
wherein the processor is configured to implement operations of the method of claim 5.

12. The server of claim 11, wherein the processor is further configured to:
receive, from the terminal, position information of an application program installed in the terminal, and
determine the multimedia information based on the position information, the multimedia information including video information switched from a predetermined position of the terminal to a position of the application program.

13. A non-transitory computer-readable storage medium, having instructions stored thereon that, when executed by a processor, implement the method of claim 1.

14. A non-transitory computer-readable storage medium, having instructions stored thereon that, when executed by a processor, implement the method of claim 5.

15. A terminal device implementing the method of claim 1, further comprising a screen, wherein the screen is configured to display the multimedia information.

* * * * *